(12) United States Patent
Jung et al.

(10) Patent No.: US 12,175,623 B2
(45) Date of Patent: *Dec. 24, 2024

(54) DYNAMIC OVER-RENDERING IN LATE-WARPING

(71) Applicant: Snap Inc., Santa Monica, CA (US)

(72) Inventors: Bernhard Jung, Perchtoldsdorf (AT); Edward Lee Kim-Koon, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,563

(22) Filed: Sep. 27, 2023

(65) Prior Publication Data

US 2024/0029197 A1  Jan. 25, 2024

Related U.S. Application Data

(63) Continuation of application No. 18/116,665, filed on Mar. 2, 2023, now Pat. No. 11,880,958, which is a continuation of application No. 17/530,242, filed on Nov. 18, 2021, now Pat. No. 11,615,506.

(60) Provisional application No. 63/189,928, filed on May 18, 2021.

(51) Int. Cl.
*G06T 3/40* (2024.01)
*G06T 19/00* (2011.01)

(52) U.S. Cl.
CPC .............. *G06T 3/40* (2013.01); *G06T 19/006* (2013.01)

(58) Field of Classification Search
None
See application file for complete search history.

(56) References Cited

U.S. PATENT DOCUMENTS

| 11,615,506 | B2 | 3/2023 | Jung et al. |
| 11,880,958 | B2 | 1/2024 | Jung et al. |
| 2021/0014539 | A1 | 1/2021 | Gao et al. |
| 2022/0375028 | A1 | 11/2022 | Jung et al. |
| 2023/0206390 | A1 | 6/2023 | Jung et al. |

FOREIGN PATENT DOCUMENTS

| CN | 117425869 | 1/2024 |
| WO | WO-2019204638 A1 | 10/2019 |
| WO | WO-2022246389 A1 | 11/2022 |

OTHER PUBLICATIONS

"U.S. Appl. No. 17/530,242, Non Final Office Action mailed Aug. 2, 2022", 9 pgs.
"U.S. Appl. No. 17/530,242, Notice of Allowance mailed Nov. 30, 2022", 8 pgs.
"U.S. Appl. No. 17/530,242, Response filed Nov. 2, 2022 to Non Final Office Action mailed Aug. 2, 2022", 11 pgs.

(Continued)

*Primary Examiner* — Robert J Craddock
(74) *Attorney, Agent, or Firm* — Schwegman Lundberg & Woessner, P.A.

(57) ABSTRACT

A method for adjusting an over-rendered area of a display in an AR device is described. The method includes identifying an angular velocity of a display device, a most recent pose of the display device, previous warp poses, and previous over-rendered areas, and adjusting a size of a dynamic over-rendered area based on a combination of the angular velocity, the most recent pose, the previous warp poses, and the previous over-rendered areas.

20 Claims, 14 Drawing Sheets

(56) References Cited

OTHER PUBLICATIONS

"U.S. Appl. No. 18/116,665, Non Final Office Action mailed Jun. 21, 2023", 11 pgs.
"U.S. Appl. No. 18/116,665, Notice of Allowance mailed Aug. 21, 2023", 8 pgs.
"U.S. Appl. No. 18/116,665, Response filed Aug. 3, 2023 to Non Final Office Action mailed Jun. 21, 2023", 10 pgs.
"International Application Serial No. PCT/US2022/072348, International Search Report mailed Aug. 26, 2022", 4 pgs.
"International Application Serial No. PCT/US2022/072348, Written Opinion mailed Aug. 26, 2022", 7 pgs.
"International Application Serial No. PCT/US2022/072348, International Preliminary Report on Patentability mailed Nov. 30, 2023", 9 pgs.
"U.S. Appl. No. 18/116,665, Corrected Notice of Allowability mailed Dec. 22, 2023", 2 pgs.

DYNAMIC OVER-RENDERING IN LATE-WARPING

RELATED APPLICATION

This application is a continuation of U.S. patent application Ser. No. 18/116,665, filed Mar. 2, 2023, which is a continuation of U.S. patent application Ser. No. 17/530,242, filed Nov. 18, 2021, which claims priority to U.S. Provisional Patent Application Ser. No. 63/189,928, filed May 18, 2021, which applications are hereby incorporated by reference in their entireties.

TECHNICAL FIELD

The subject matter disclosed herein generally relates to a display system. Specifically, the present disclosure addresses systems and methods for reducing motion-to-photon latency in augmented reality (AR) devices.

BACKGROUND

Augmented reality (AR) systems present virtual content to augment a user's real world environment. For example, virtual content overlaid over a physical object can be used to create the illusion that the physical object is moving, animated, etc. An AR device worn by a user continuously updates presentation of the virtual content based on the user's movements to create the illusion that the virtual content is physically present in the user's real world environment. For example, as the user moves their head, the AR device updates presentation of the virtual content to create the illusion that the virtual content remains in the same geographic position within the user's real world environment. Accordingly, a user may move around a virtual object presented by the AR device in the same way the user would around a physical object.

To convincingly create the illusion that the virtual object is in the user's real world environment, the AR device has to update presentation of the virtual object almost instantaneously on movement of the device. However, virtual content can take a longer time to be updated because the AR device has to process the environmental data, render the virtual content, and then project the virtual content. This process creates a latency between the time a physical object is tracked by the AR device to the time a rendered virtual object is displayed in a display of the AR device. This latency is also referred to as "motion-to-photon latency." Any perceivable motion-to-photon latency diminishes the user's experience.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
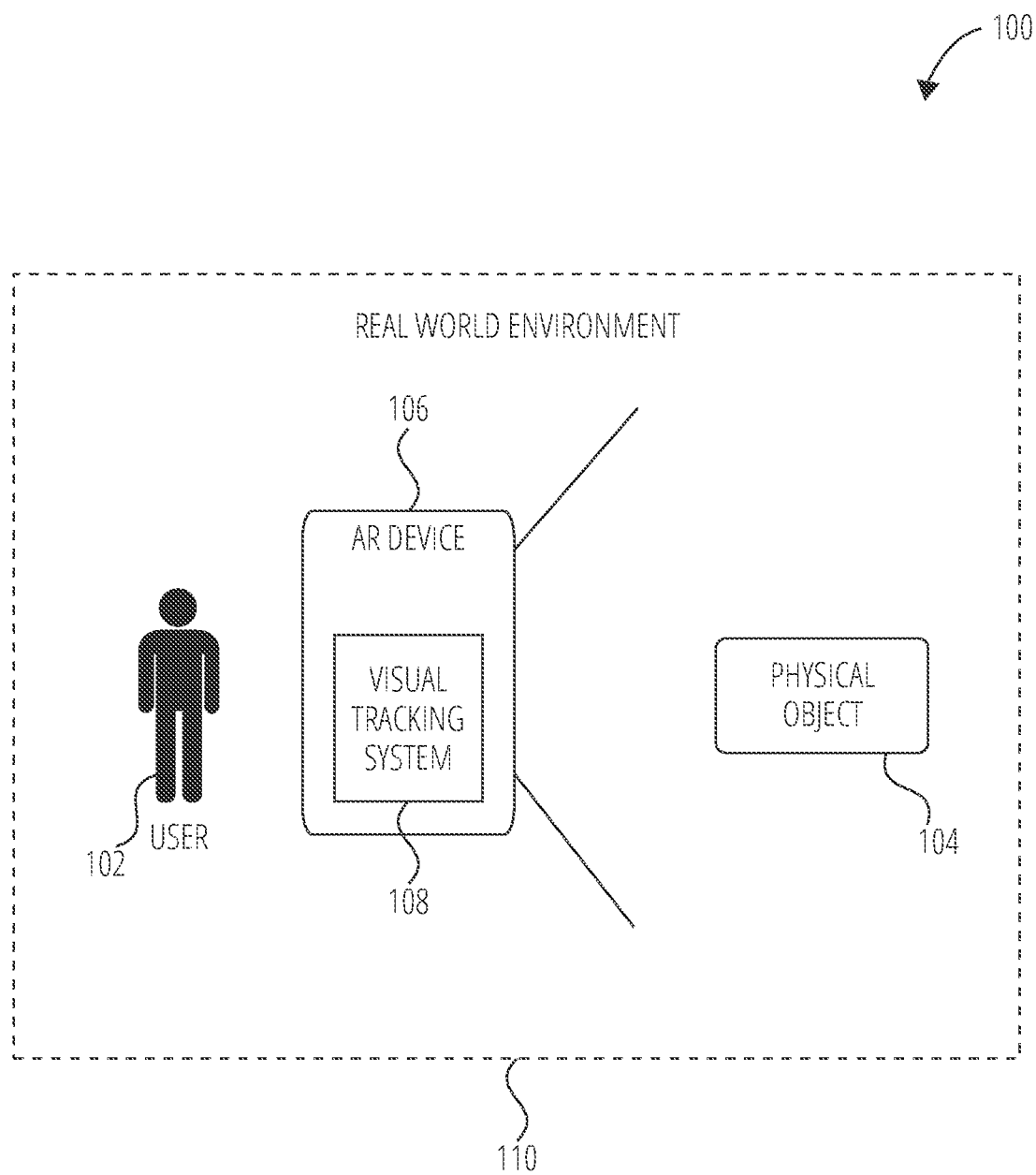
FIG. 1 is a block diagram illustrating an environment for operating an AR device in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. AR creates the illusion that the virtual content is physically present in the user's real world environment, and appear to be attached or interact with the user's real-world environment.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The term "AR display device" (also referred to as "AR device") is used herein to refer to a computing device operating an AR application. The term "VR display device" (also referred to as "VR device") is used herein to refer to a computing device operating a VR application. The term "AR/VR display device" (also referred to as "AR/VR device") is used herein to refer to a computing device operating a combination of the AR application and the VR application.

The term "visual tracking system" (also referred to as a "visual tracking device") is used herein to refer to a computer-operated application that tracks visual features identified in images captured by one or more cameras of the visual tracking system. The visual tracking system builds a model of a real-world environment based on the tracked visual features. Non-limiting examples of the visual tracking system include: a visual Simultaneous Localization and Mapping system (VSLAM), and Visual Inertial Odometry (VIO) system. VSLAM can be used to build a target from an environment, or a scene based on one or more cameras of the visual tracking system. VIO (also referred to as a visual-inertial tracking) determines a latest pose (e.g., position and orientation) of a device based on data acquired from its multiple sensors (e.g., optical sensors, inertial sensors).

The term "Inertial Measurement Unit" (IMU) is used herein to refer to a device that can report on the inertial status of a moving body including the acceleration, velocity, orientation, and position of the moving body. An IMU enables tracking of movement of a body by integrating the acceleration and the angular velocity measured by the IMU. IMU can also refer to a combination of accelerometers and gyroscopes that can determine and quantify linear acceleration and angular velocity, respectively. The values obtained from the IMUs gyroscopes can be processed to obtain the pitch, roll, and heading of the IMU and, therefore, of the body with which the IMU is associated. Signals from the IMU's accelerometers also can be processed to obtain velocity and displacement of the IMU.

The term "motion-to-photon latency" (M2P latency) is used herein to refer to the duration between the user moving a visual tracking device and the presentation of its virtual content adapting to that specific motion. The motion-to-photon latency can also refer to latency associated with presenting virtual content in an AR device. As the user moves the AR device, the user's view of the real-world environment changes instantaneously. However, the virtual content takes a longer time to update because the AR device has to process the environmental data with IMU data, render the virtual content, and project the virtual content in front of the user's field of view. Motion-to-photon latency can cause the virtual content to appear jittery or lagging, and diminishes the user's AR experience.

The terms "time-warp" (also referred to as "time-warping", "late-warp", "late-warping") is used herein to refer to a re-projection technique that warps the rendered image before sending it to the display to correct for the head movement occurred after the rendering. This process takes the already rendered image, modifies it with the latest collected rotational data from the IMU, and then displays the warped image on the screen.

One problem with implementing AR is latency associated with presenting virtual content. As the user moves the AR device, the user's view of the real world environment changes instantaneously. The virtual content takes a longer time to change because the AR display device has to process the environmental data with Inertial Measurement Unit (IMU) data, render the virtual content, and project the virtual content in front of the user's field of view. This latency is referred hereto as M2P latency.

As previously mentioned, late-warping compensates for the M2P latency by warping the rendered image to account for pose differences. The warping process can lead to missing information for some pixels that then typically remain black. "Over-rendering" is a technique used to render more pixels than actually shown on the display to be able to fill all pixels on the screen during late-warping. However, the over-rendered area can remain large. Larger over-rendered areas (than is necessary) result in more memory and power consumption.

The present application describes a method for dynamically adjusting a size of the over-rendered area for which additional pixels are rendered in order to reduce the number of shaded pixels while keeping the number of black pixels after late-warping small. For example, the present system defines a dynamic over-rendering function for a specific render time based on: (a) most recent pose and linear/angular velocity, (b) previous warp poses, and (c) previous over-rendered areas. The prediction inaccuracy and reduced render-rate, the amount of over-rendering needed depend on the maximum prediction error or maximum pose difference between two warping poses (which both depend on the dynamics of the head motion of the AR device).

In one example embodiment, a method for adjusting an over-rendered area of a display in an AR device is described. The method includes identifying an angular velocity of a display device, a most recent pose of the display device, previous warp poses, and previous over-rendered areas, and adjusting a size of a dynamic over-rendered area based on a combination of the angular velocity, the most recent pose, the previous warp poses, and the previous over-rendered areas.

As a result, one or more of the methodologies described herein facilitate solving the technical problem of power consumption saving by limiting the size of over-rendered areas based on pose differences and angular/linear velocity of the AR device. The presently described method provides an improvement to an operation of the functioning of a computing device by reducing computational cost, power consumption, and thermal impact. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a network diagram illustrating an environment 100 suitable for operating an AR device 106, according to some example embodiments. The environment 100 includes a user 102, an AR device 106, and a physical object 104. A user 102 operates the AR device 106. The user 102 may be a human user (e.g., a human being), a machine user (e.g., a computer configured by a software program to interact with the AR device 106), or any suitable combination thereof (e.g., a human assisted by a machine or a machine supervised by a human). The user 102 is associated with the AR device 106.

The AR device 106 may be a computing device with a display such as a smartphone, a tablet computer, or a wearable computing device (e.g., watch or glasses). The computing device may be hand-held or may be removable mounted to a head of the user 102. In one example, the display includes a screen that displays images captured with a camera of the AR device 106. In another example, the display of the device may be transparent such as in lenses of wearable computing glasses. In other examples, the display may be non-transparent, partially transparent, partially opaque. In yet other examples, the display may be wearable by the user 102 to cover the field of vision of the user 102.

The AR device 106 includes an AR application that generates virtual content based on images detected with the camera of the AR device 106. For example, the user 102 may point a camera of the AR device 106 to capture an image of the physical object 104. The AR application generates virtual content corresponding to an identified object (e.g., physical object 104) in the image and presents the virtual content in a display of the AR device 106.

The AR device 106 includes a visual tracking system 108. The visual tracking system 108 tracks the pose (e.g., position and orientation) of the AR device 106 relative to the real world environment 110 using, for example, optical sensors (e.g., depth-enabled 3D camera, image camera), inertial sensors (e.g., gyroscope, accelerometer), wireless sensors (Bluetooth, Wi-Fi), GPS sensor, and audio sensor. In one example, the AR device 106 displays virtual content based on the pose of the AR device 106 relative to the real world environment 110 and/or the physical object 104.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 10 to FIG. 11. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The AR device 106 may operate over a computer network. The computer network may be any network that enables communication between or among machines, databases, and devices. Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Figure 2:
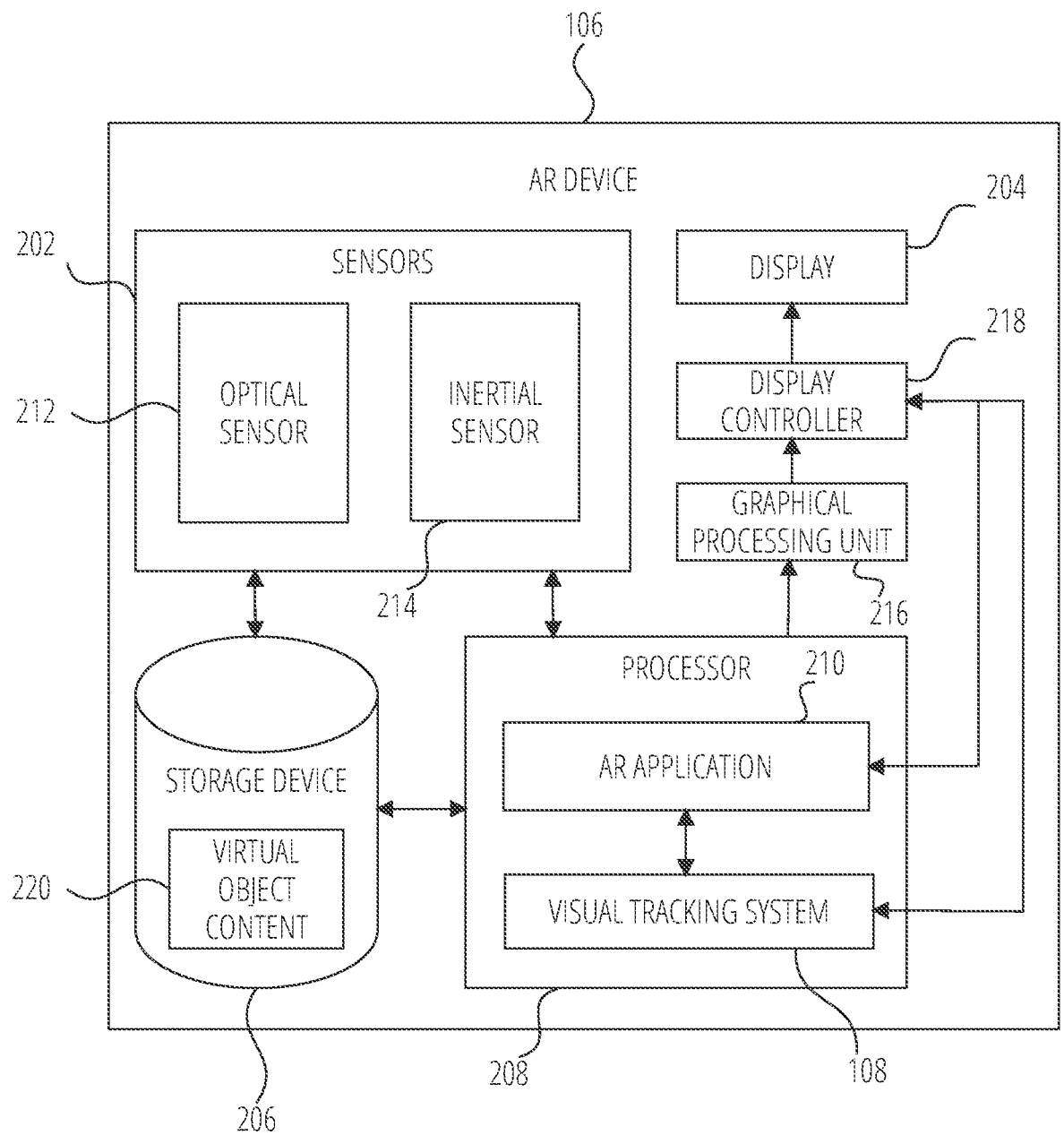
FIG. 2 is a block diagram illustrating an AR/VR display device in accordance with one example embodiment.

FIG. 2 is a block diagram illustrating modules (e.g., components) of the AR device 106, according to some example embodiments. The AR device 106 includes sensors 202, a display 204, a processor 208, a Graphical Processing Unit 216, a display controller 218, and a storage device 206. Examples of AR device 106 include a wearable computing device (e.g., glasses), a tablet computer, a navigational device, a portable media device, or a smart phone.

The sensors 202 include, for example, an optical sensor 212 (e.g., camera such as a color camera, a thermal camera, a depth sensor and one or multiple grayscale, global shutter tracking cameras) and an inertial sensor 214 (e.g., gyroscope, accelerometer, magnetometer). Other examples of sensors 202 include a proximity or location sensor (e.g., near field communication, GPS, Bluetooth, Wifi), an audio sensor (e.g., a microphone), or any suitable combination thereof. It is noted that the sensors 202 described herein are for illustration purposes and the sensors 202 are thus not limited to the ones described above.

The display 204 includes a screen or monitor configured to display images generated by the processor 208. In one example embodiment, the display 204 may be transparent or semi-transparent so that the user 102 can see through the display 204 (in AR use case). In another example, the display 204 (e.g., a LCOS display) presents each frame of virtual content in multiple presentations.

The processor 208 includes an AR application 210 and a visual tracking system 108. The AR application 210 detects and identifies a physical environment or the physical object 104 using computer vision. The AR application 210 retrieves a virtual object (e.g., 3D object model) based on the identified physical object 104 or physical environment. The AR application 210 renders the virtual object in the display 204. For an AR application, the AR application 210 includes a local rendering engine that renders a 3D model of a virtual object overlaid (e.g., superimposed upon, or otherwise displayed in tandem with) on an image or a view of the physical object 104. A view of the virtual object may be manipulated by adjusting a position of the physical object 104 (e.g., its physical location, orientation, or both) relative to the optical sensor 212. Similarly, a view of the virtual object may be manipulated by adjusting a pose of the AR device 106 relative to the 104. For a VR application, the AR application 210 displays the virtual object in the display 204 at a location (in the display 204) determined based on a pose of the AR device 106.

In one example embodiment, the visual tracking system 108 estimates a pose of the AR device 106. For example, the visual tracking system 108 uses image data and corresponding inertial data from the optical sensor 212 and the inertial sensor 214 to track a location and pose of the AR device 106 relative to a frame of reference (e.g., real world environment 110). In one example, the visual tracking system 108 uses the sensor data to determine the three-dimensional pose of the AR device 106. The three-dimensional pose is a determined orientation and position of the AR device 106 in relation to the user's real world environment 110. For example, the AR device 106 may use images of the user's real world environment 110, as well as other sensor data to identify a relative position and orientation of the AR device 106 from physical objects in the real world environment 110 surrounding the AR device 106. The visual tracking system 108 continually gathers and uses updated sensor data describing movements of the AR device 106 to determine updated three-dimensional poses of the AR device 106 that indicate changes in the relative position and orientation of the AR device 106 from the physical objects in the real world environment 110. The visual tracking system 108 provides the three-dimensional pose of the AR device 106 to the Graphical Processing Unit 216.

The Graphical Processing Unit 216 includes a render engine (not shown) that is configured to render a frame of a 3D model of a virtual object based on the virtual content provided by the AR application 210 and the pose provided by the visual tracking system 108. In other words, the Graphical Processing Unit 216 uses the three-dimensional pose of the AR device 106 to generate frames of virtual content to be presented on the display 204. For example, the Graphical Processing Unit 216 uses the three-dimensional pose to render a frame of the virtual content such that the virtual content is presented at an appropriate orientation and position in the display 204 to properly augment the user's reality. As an example, the Graphical Processing Unit 216 may use the three-dimensional pose data to render a frame of virtual content such that, when presented on the display 204, the virtual content overlaps with a physical object in the user's real world environment 110. The Graphical Processing Unit 216 generates updated frames of virtual content based on updated three-dimensional poses of the AR device 106, which reflect changes in the position and orientation of the user in relation to physical objects in the user's real world environment 110. The Graphical Processing Unit 216 transfers the rendered frame to the display controller 218.

The display controller 218 is positioned as an intermediary between the Graphical Processing Unit 216 and the display 204. The display controller 218 receives the image data (e.g., rendered frame) from the Graphical Processing Unit 216, warps the rendered frame by re-adjusting a location of the rendered virtual content in a time-warped frame. The display controller 218 performs a late-warping transformation based on a latest pose of the AR device 106 and the latest tracking information (of a tracked physical object, of a preset animation of a virtual object, of multiple physical objects having different movement). The display controller 218 provides the time-warped frame to the display 204 for display.

The storage device 206 stores virtual object content 220. The virtual object content 220 includes, for example, a database of visual references (e.g., images, QR codes) and corresponding virtual content (e.g., three-dimensional model of virtual objects).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
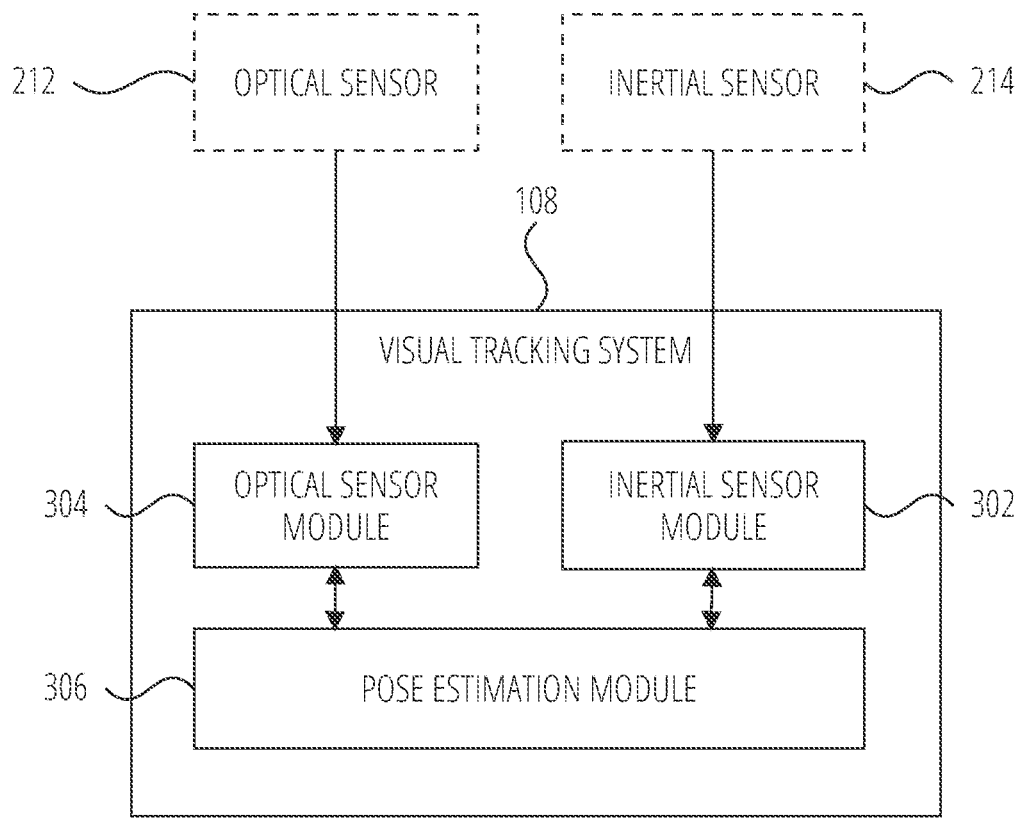
FIG. 3 is a block diagram illustrating a visual tracking system in accordance with one example embodiment.

FIG. 3 is a block diagram illustrating a visual tracking system in accordance with one example embodiment. The visual tracking system 108 includes, for example, an inertial sensor module 302, an optical sensor module 304, and a pose estimation module 306. The inertial sensor module 302 accesses inertial sensor data from the inertial sensor 214. The optical sensor module 304 accesses optical sensor data from the optical sensor 212.

The pose estimation module 306 determines a pose (e.g., location, position, orientation) of the AR device 106 relative to a frame of reference (e.g., real world environment 110). In one example embodiment, the pose estimation module 306 includes a VIO system that estimates the pose of the AR device 106 based on 3D maps of feature points from images captured with the optical sensor 212 and the inertial sensor data captured with the inertial sensor 214.

For example, the pose estimation module 306 operates an application that tracks visual features (e.g., 3D feature points) identified in images captured by the optical sensor 212 of the AR device 106. The visual tracking system 108 builds a model of a real-world environment based on the tracked visual features. The visual tracking system 108 includes, for example, a visual Simultaneous Localization and Mapping system (VSLAM) or a Visual Inertial Odometry (VIO) system. VSLAM can be used to build a target from an environment, or a scene based on one or more cameras of the visual tracking system 108. VIO (also referred to as a visual-inertial tracking) determines a latest pose (e.g., position and orientation) of a device based on data acquired from its multiple sensors (e.g., optical sensors, inertial sensors).

Figure 4:
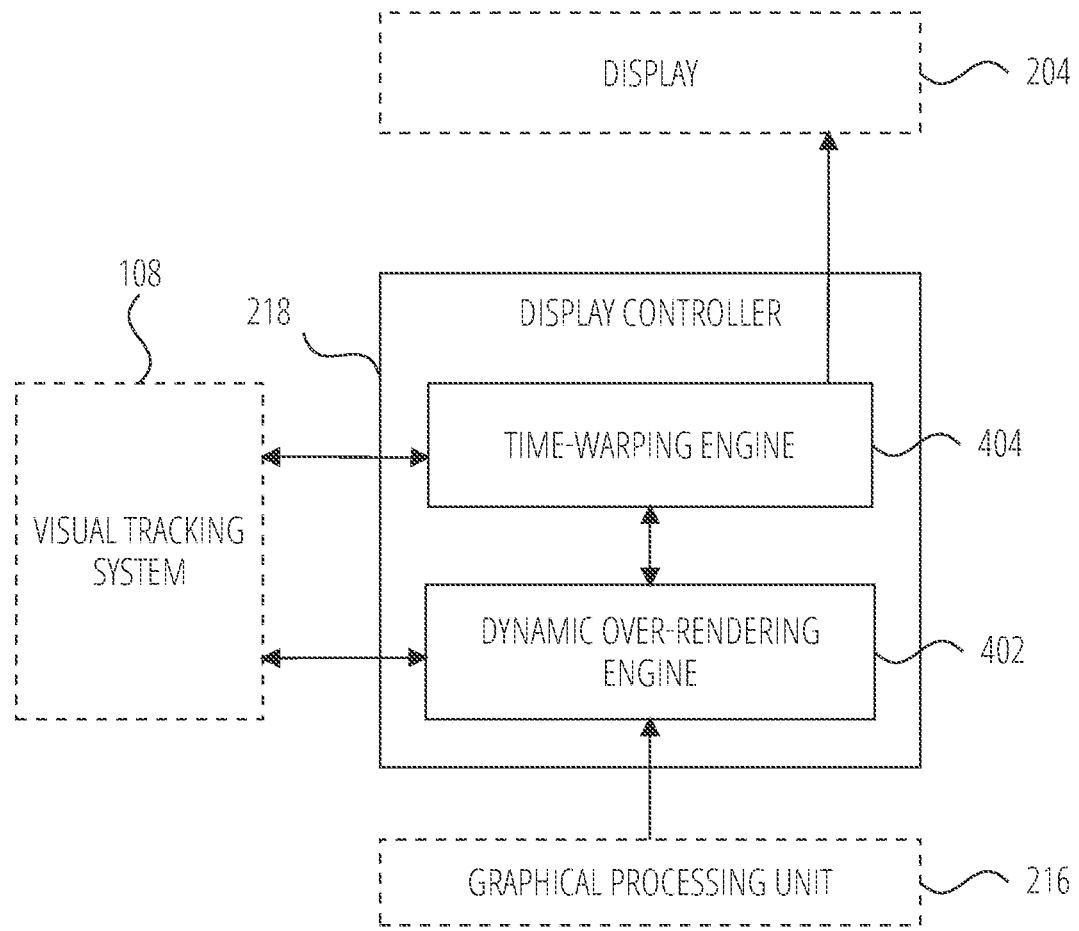
FIG. 4 is a block diagram illustrating a display controller in accordance with one example embodiment.

FIG. 4 is a block diagram illustrating a display controller 218 in accordance with one example embodiment. The display controller 218 includes a dynamic over-rendering engine 402 and a time-warping engine 404.

The time-warping engine 404 accesses a latest pose of the AR device 106 from the visual tracking system 108. The time-warping engine 404 re-projects the rendered frame generated with the Graphical Processing Unit 216 based on the pose of the AR device 106 (used to compute the rendered frame), and the latest pose of the AR device 106 (provided by the visual tracking system 108 to the display controller 218).

The dynamic over-rendering engine 402 dynamically adjusts a size of an over-rendered area of the rendered frame. For time-warping to properly operate, the size of the rendered frame should be larger than the size of the display 204. Otherwise, when the time-warping engine 404 shifts the rendered image, the time-warping engine 404 may end up shifting empty pixels into a visible area. In one example embodiment, the dynamic over-rendering engine 402 adjusts the size of the rendered frame based on a combination of: (a) most recent pose of the visual tracking system 108 and linear/angular velocity of the visual tracking system 108, (b) previous warp poses of the visual tracking system 108, and (c) previous over-rendered areas from the dynamic over-rendering engine 402. The adjusted over-rendered frame is provided to the display 204 for display. Example components of the dynamic over-rendering engine 402 are described further below with respect to FIG. 5.

Figure 5:
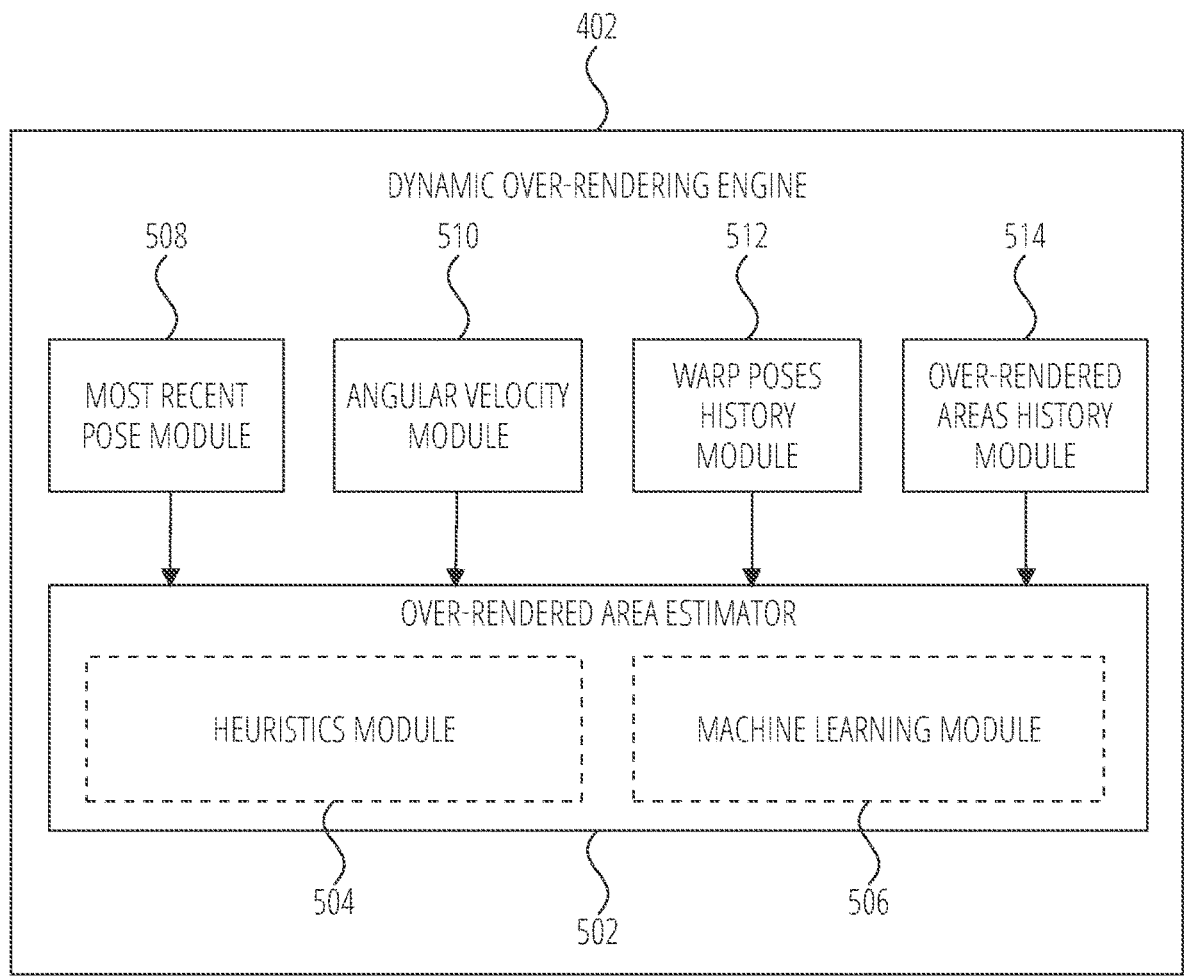
FIG. 5 is a block diagram illustrating a dynamic over-rendering module in accordance with one example embodiment.

FIG. 5 is a block diagram illustrating a dynamic over-rendering engine 402 in accordance with one example embodiment. The dynamic over-rendering engine 402 includes a most recent pose module 508, angular velocity module 510, a warp poses history module 512, an over-rendered areas history module 514, and an over-rendered area estimator 502.

The most recent pose module 508 identifies a most recent pose of the AR device 106. For example, the most recent pose module 508 accesses a latest pose of the AR device 106 based on latest VIO data from the visual tracking system 108.

The angular velocity module 510 identifies an angular velocity of the AR device 106. In one example, the angular velocity module 510 retrieves the angular velocity from the IMU. In another example, the angular velocity module 510 estimates the angular velocity from the VIO data (from the visual tracking system 108).

The warp poses history module 512 identifies warp poses that were previously generated by the time-warping engine 404. For example, the warp poses history module 512 retrieves a warped pose corresponding to a last pose identified by the visual tracking system 108. The warp poses history module 512 may store a preset number of last warped poses in the storage devices 206.

The over-rendered areas history module 514 identifies over-rendered areas that were previously generated by the dynamic over-rendering engine 402. For example, the over-rendered areas history module 514 retrieves an over-rendered area corresponding to a last warped pose or a last pose.

The over-rendered areas history module 514 may store a preset number of last over-rendered areas in the storage device 206.

The over-rendered area estimator 502 accesses most recent pose data from the most recent pose module 508, angular velocity data from angular velocity module 510, warp pose history data from warp poses history module 512, and over-rendered areas history data from over-rendered areas history module 514. The over-rendered area estimator 502 adjusts a size of the over-rendered area based on the most recent pose data, angular velocity data, warp pose history data, and over-rendered area history data.

In one example embodiment, the over-rendered area estimator 502 includes a heuristics module 504 and a machine learning module 506. The heuristics module 504 performs heuristic-based computation method on the most recent pose data, angular velocity data, warp pose history data, and over-rendered area history data to estimate the required area that needs to be rendered by the time-warping engine 404. In another example, the heuristics module 504 performs a statistical analysis on the received data to estimate the required area.

The machine learning module 506 generates training data based on the most recent pose data, angular velocity data, warp pose history data, and over-rendered area history data. The machine learning module 506 uses the training data to train a model that identifies sizes of over-rendered area based on the different parameters. The trained model can then be used to identify an optimal over-rendered area. In another example, the over-rendered area estimator 502 uses a combination of the heuristics module 504 and machine learning module 506 to estimate the optimal over-rendered area.

Figure 6:
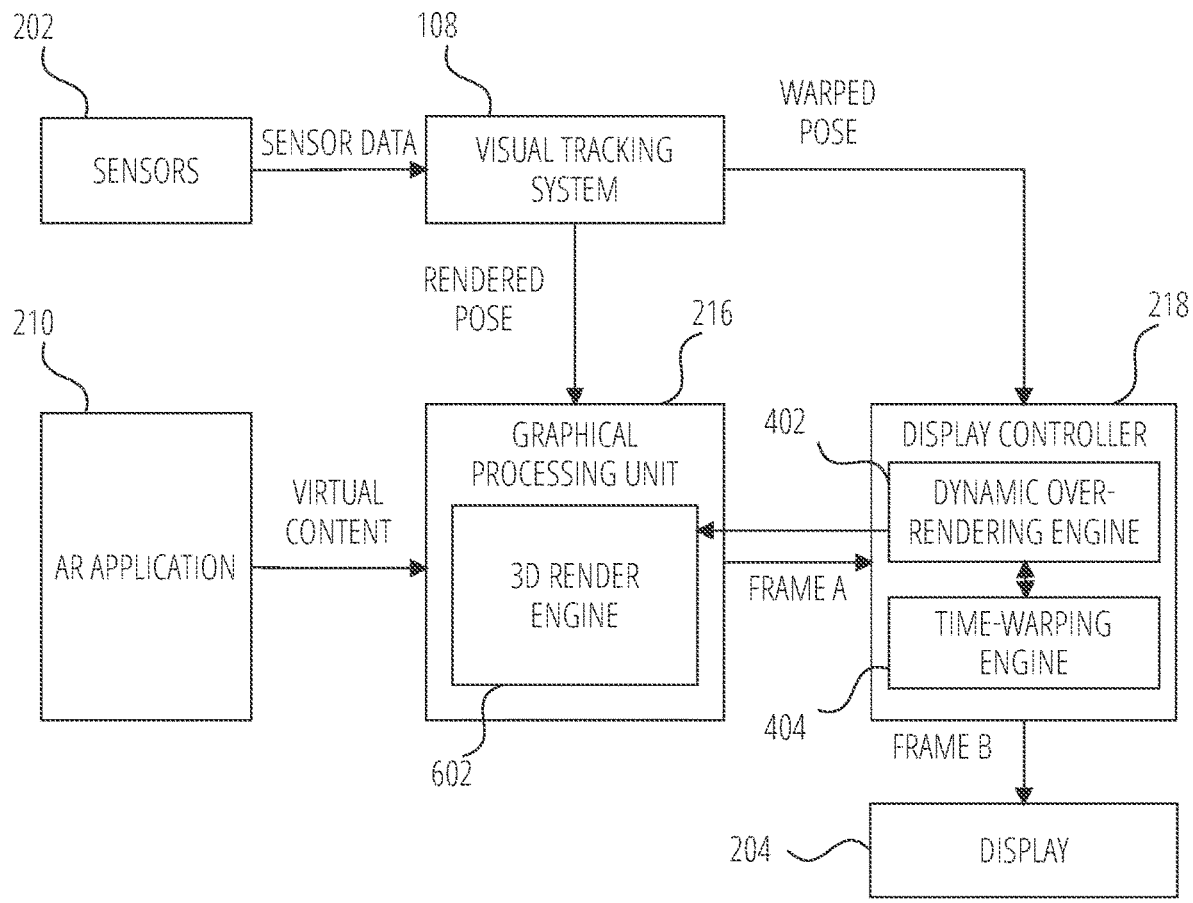
FIG. 6 is a block diagram illustrating a dynamic over-rendering process in accordance with one example embodiment.

FIG. 6 is a block diagram illustrating an example process in accordance with one example embodiment. The visual tracking system 108 receives sensor data from sensors 202 to determine a pose (e.g., pose a) of the AR device 106. The visual tracking system 108 provides the pose to the Graphical Processing Unit 216. The Graphical Processing Unit 216 uses a 3D render engine 602 to render a frame (e.g., frame a) of virtual content (provided by the AR application 210) and at a first location (in the display 204) based on the rotational pose (e.g., pose a) determined with the visual tracking system 108. The Graphical Processing Unit 216 provides the rendered frame (e.g., frame a) to the display controller 218.

The display controller 218 receives the latest pose (e.g., pose b) from the visual tracking system 108. In other words, pose b is a more recent pose of the AR device 106 than pose a. The dynamic over-rendering engine 402 dynamically adjusts a size of an over-rendered area of the rendered frame.

The time-warping engine 404 re-projects the rendered frame by performing a time-warping operation to the rendered frame (e.g., frame a) to generate a new frame (e.g., frame b). The display controller 218 communicates frame b to the display 204 for display.

Figure 7:
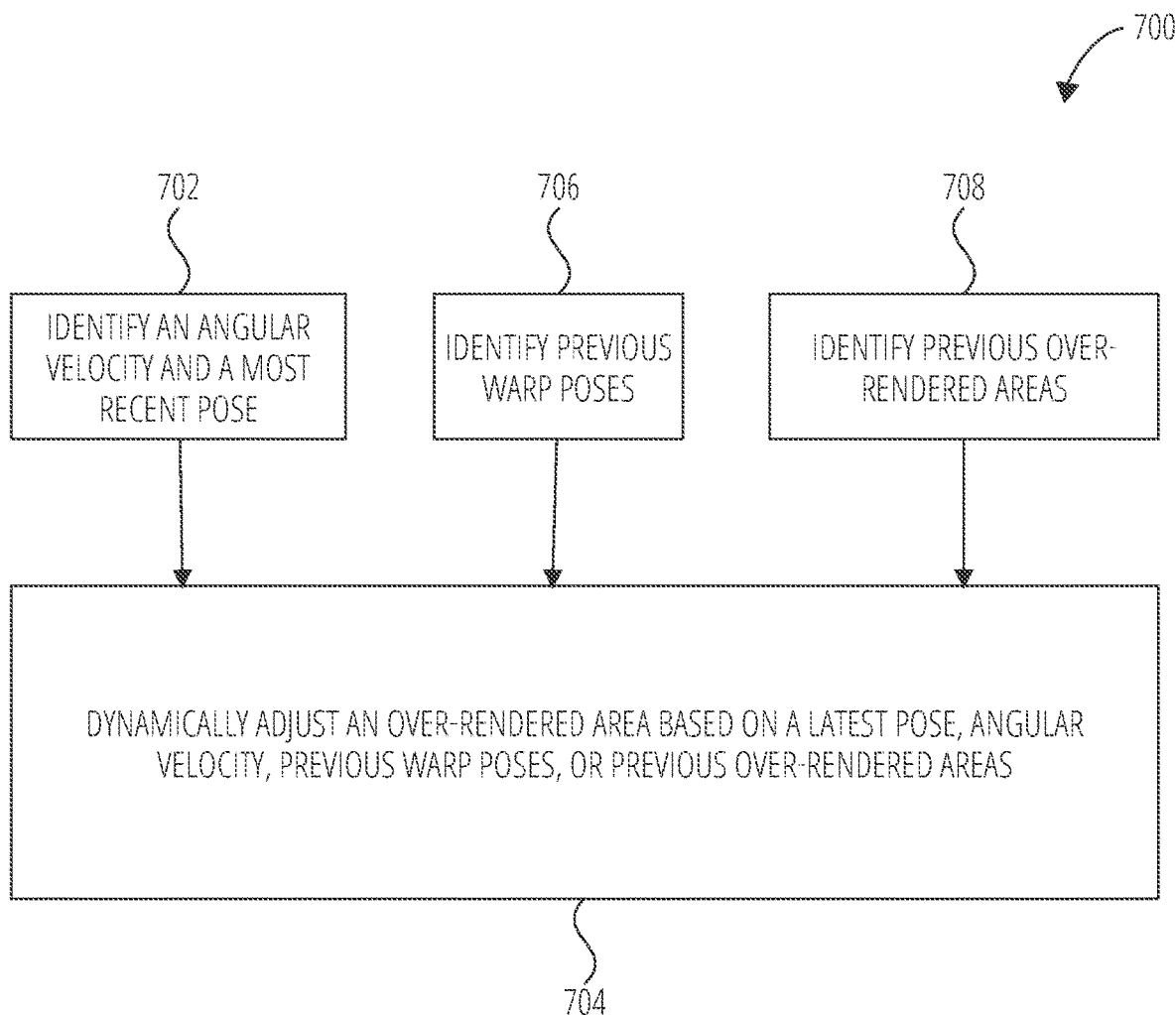
FIG. 7 is a flow diagram illustrating a process for dynamic over-rendering in accordance with one example embodiment.

FIG. 7 is a flow diagram illustrating a process 700 for dynamic over-rendering in accordance with one example embodiment. In block 702, the visual tracking system 108 identifies an angular velocity and a most recent pose of the AR device 106. In block 706, the dynamic over-rendering engine 402 identifies previous warp poses. In block 708, the dynamic over-rendering engine 402 identifies previous over-rendered areas. In block 704, the dynamic over-rendering engine 402 dynamically adjusts an over-rendered area based on the most recent pose, angular velocity, previous warp poses, or previous over-rendered areas.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 8:
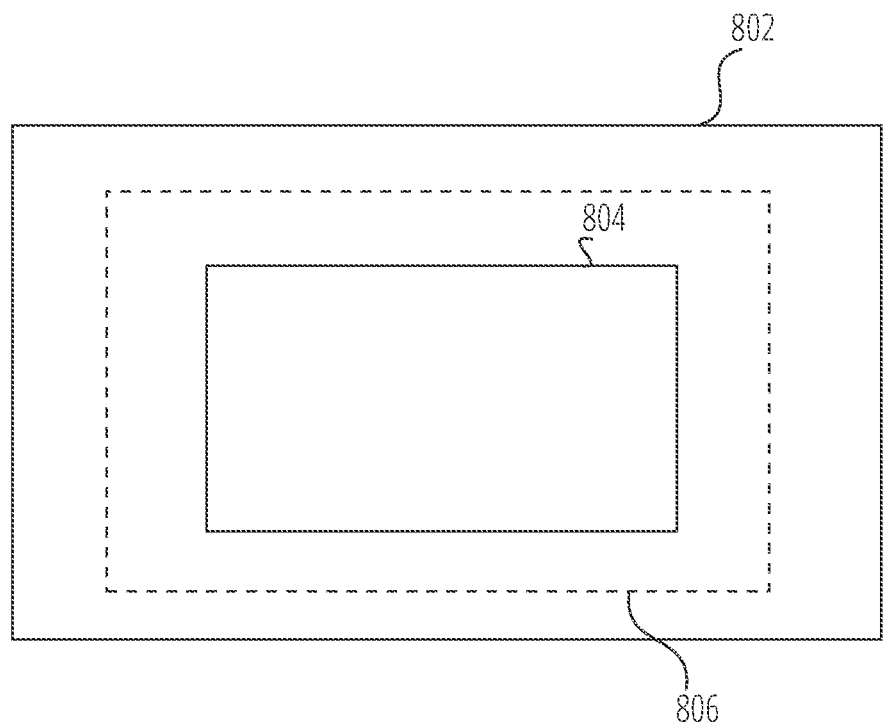
FIG. 8 illustrates an example of a dynamic over-rendering area in accordance with one example embodiment.

FIG. 8 illustrates an example of a dynamic over-rendering area in accordance with one example embodiment. For example, the size of the dynamic over-rendered area 806 is less than the size of the over-rendered area 802 and later than the screen size 804.

Figure 9:
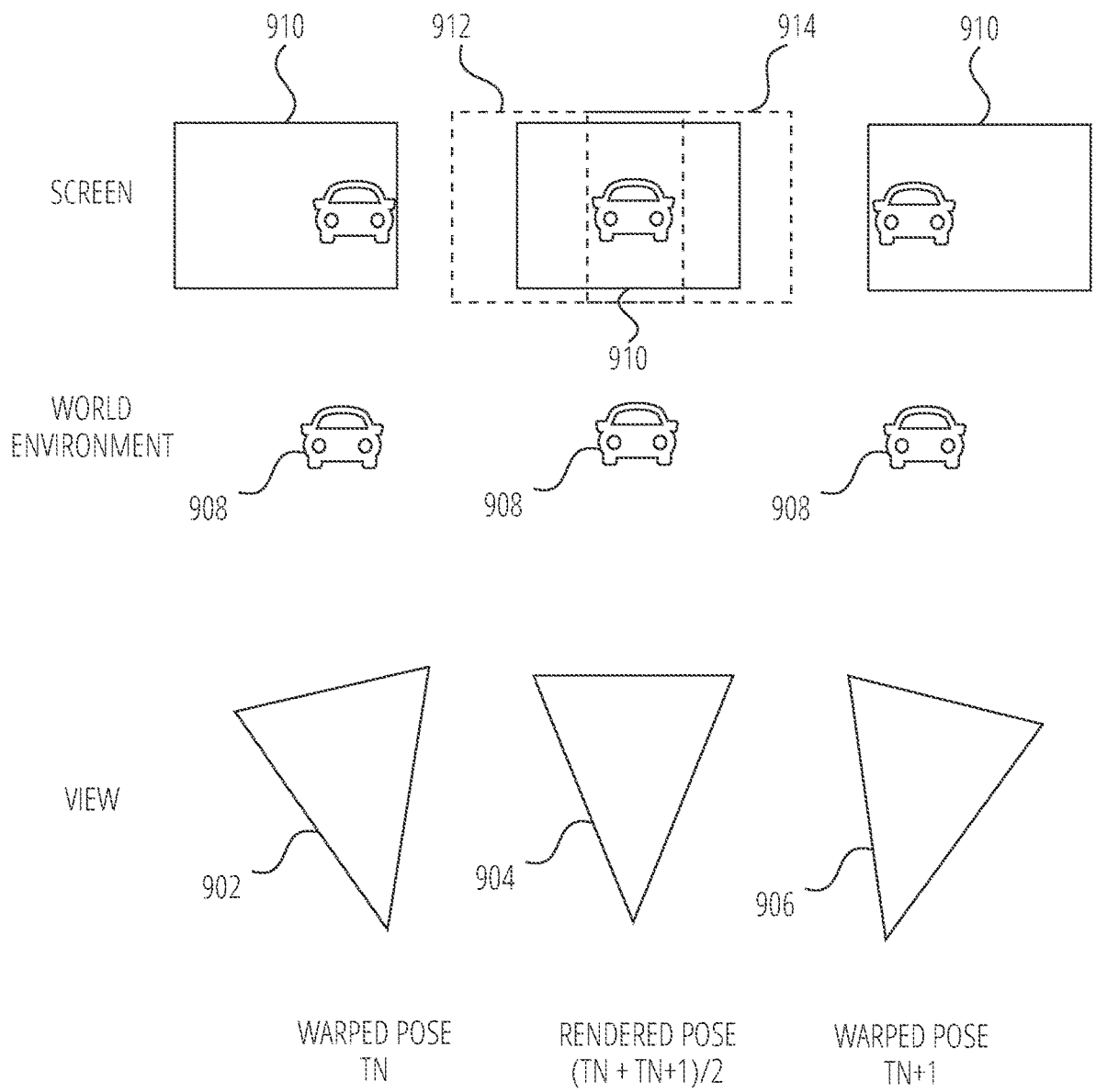
FIG. 9 illustrates an example of dynamic over-rendering areas in accordance with one example embodiment.

FIG. 9 illustrates an example of dynamic over-rendering areas in accordance with one example embodiment. The AR device 106 is pointed at view at tn 902 to capture an image of a physical object 908 at time tn. The screen 910 of the AR device 106 displayed the image of a rendered virtual object corresponding to the physical object 908 at a first location.

The AR device 106 is pointed at view at tn+1 906 to capture the image of the physical object 908 at time tn+1. The screen 910 of the AR device 106 displayed the image of the rendered virtual object corresponding to the physical object 908 at a second location.

The visual tracking system 108 determines the view at rendered pose 904 and combines over-rendered area for tn 912 (corresponding to the warp pose tn) with over-rendered area for tn+1 914 (corresponding to warp pose tn+1).

Figure 10:
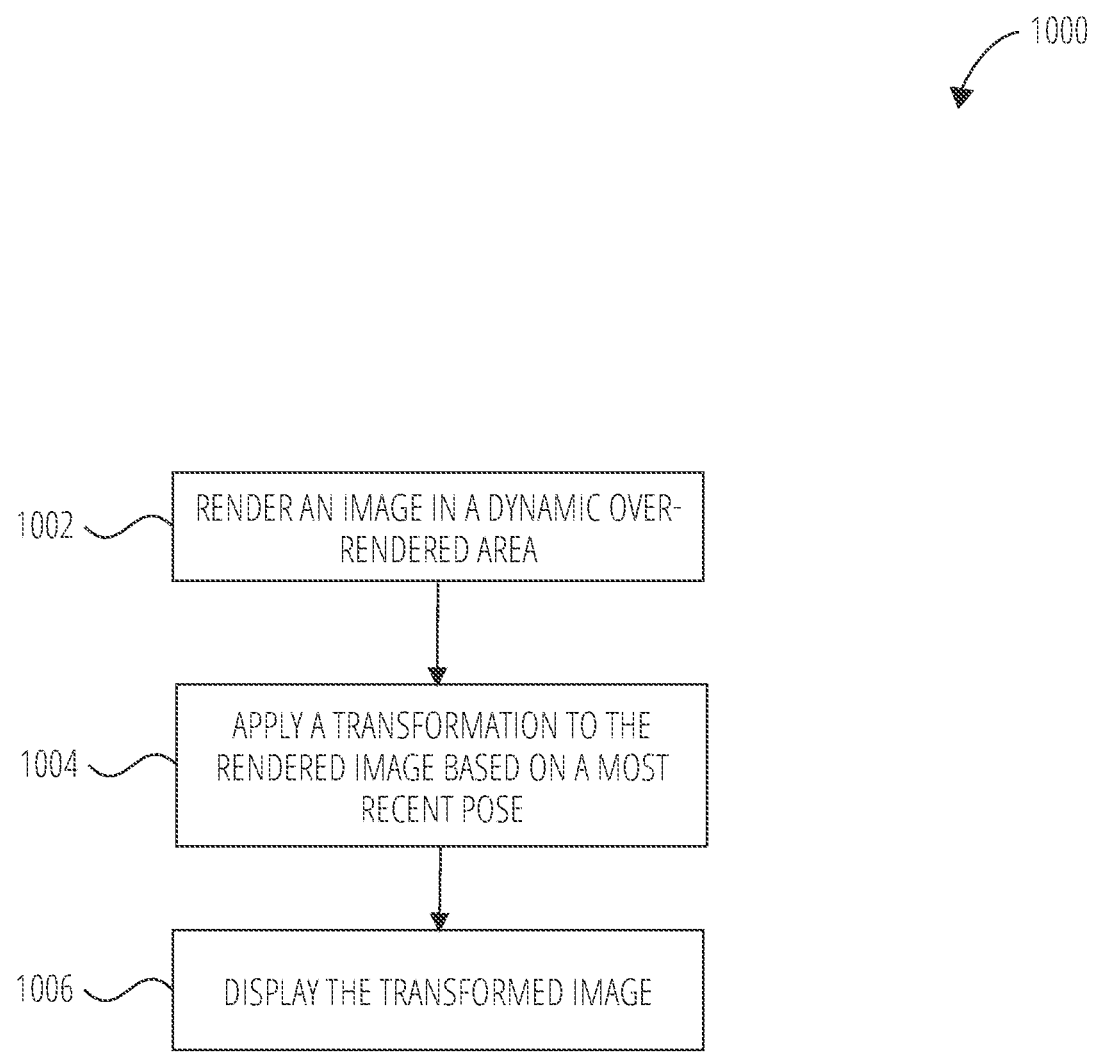
FIG. 10 is a flow diagram illustrating a method for rendering an image in a dynamic over-rendered area in accordance with one example embodiment.

FIG. 10 is a flow diagram illustrating a method 1000 for rendering an image in a dynamic over-rendered area in accordance with one example embodiment. Operations in the method 1000 may be performed by the AR device 106, using components (e.g., modules, engines) described above with respect to FIG. 2. Accordingly, the method 1000 is described by way of example with reference to the AR device 106 However, it shall be appreciated that at least some of the operations of the method 1000 may be deployed on various other hardware configurations or be performed by similar Components residing elsewhere.

In block 1002, the AR device 106 renders an image in a dynamic over-rendered area. For example, the Graphical Processing Unit 216 renders the image. In block 1004, the AR device 106 applies a transformation to the rendered image based on a most recent pose of the AR device 106. For example, the display controller 218 determines a size of an over-rendered area and applies a time-warping algorithm to the rendered image corresponding to the over-rendered area. In block 1006, the AR device 106 displays the transformed image. For example, the display 204 projects the warped image.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 11:
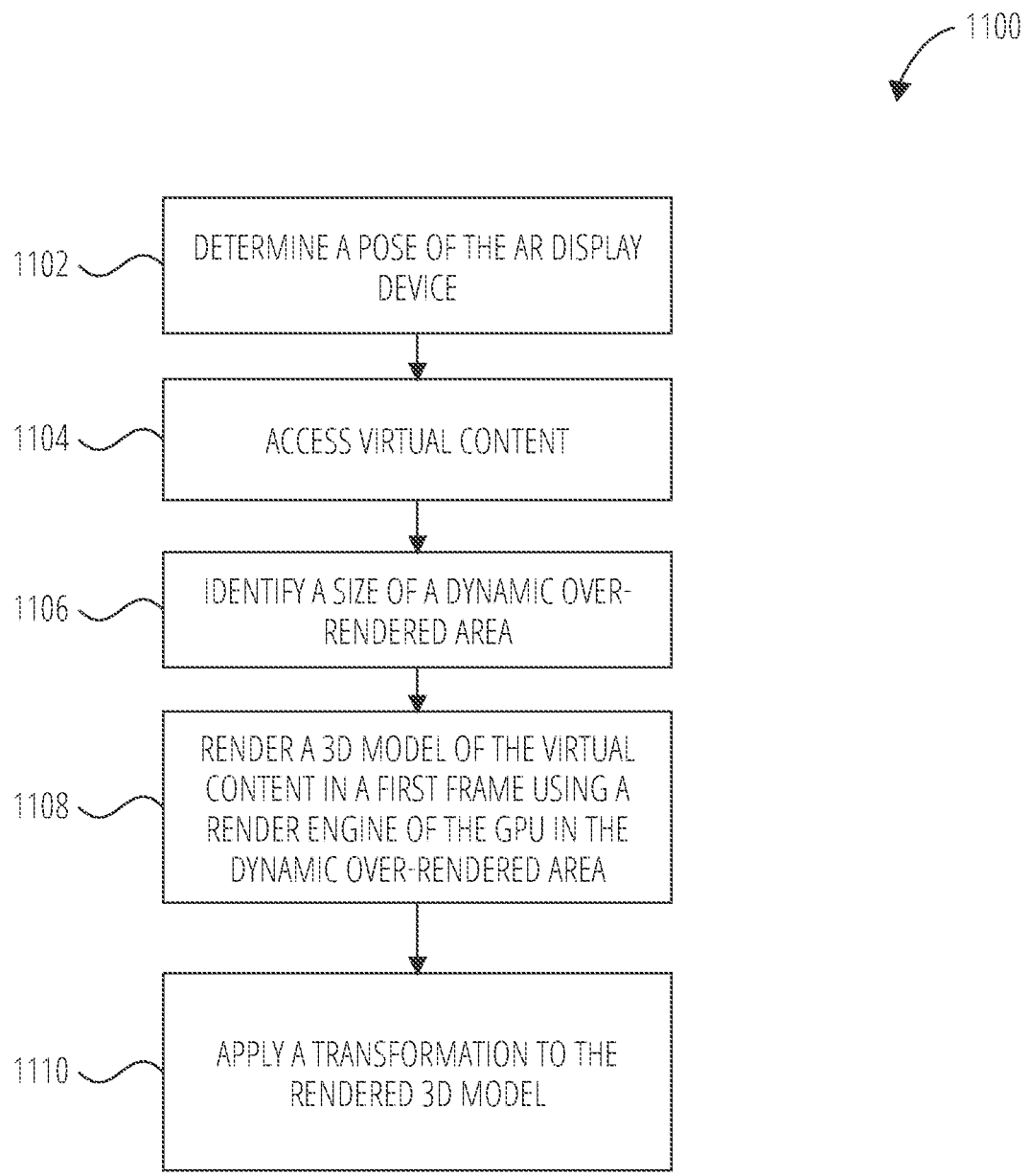
FIG. 11 is a flow diagram illustrating a method for rendering an image in a dynamic over-rendered area in accordance with one example embodiment.

FIG. 11 is a flow diagram illustrating a method 1100 for rendering an image in a dynamic over-rendered area in accordance with one example embodiment. Operations in the method 1100 may be performed by the AR device 106, using components (e.g., modules, engines) described above with respect to FIG. 2. Accordingly, the method 1100 is described by way of example with reference to the AR device 106 However, it shall be appreciated that at least some of the operations of the method 1100 may be deployed on various other hardware configurations or be performed by similar components residing elsewhere.

In block 1102, the AR device 106 determines a first pose. In one example embodiment, the visual tracking system 108 identifies the first pose of the AR device 106. In block 1104, the AR device 106 accesses virtual content. In one example embodiment, the AR application 210 accesses virtual object content 220 from the storage device 206.

In block 1106, the AR device 106 identifies a size of a dynamic over-rendered area. In one example embodiment, the dynamic over-rendering engine 402 determines the size of the over-rendered area. In block 1108, the AR device 106 renders a 3D model of the virtual content in a first frame using a render engine of the Graphical Processing Unit 216 in the dynamic over-rendered area. In block 1110, the time-warping engine 404 applies a transformation to the rendered 3D model.

System with Head-Wearable Apparatus

Figure 12:
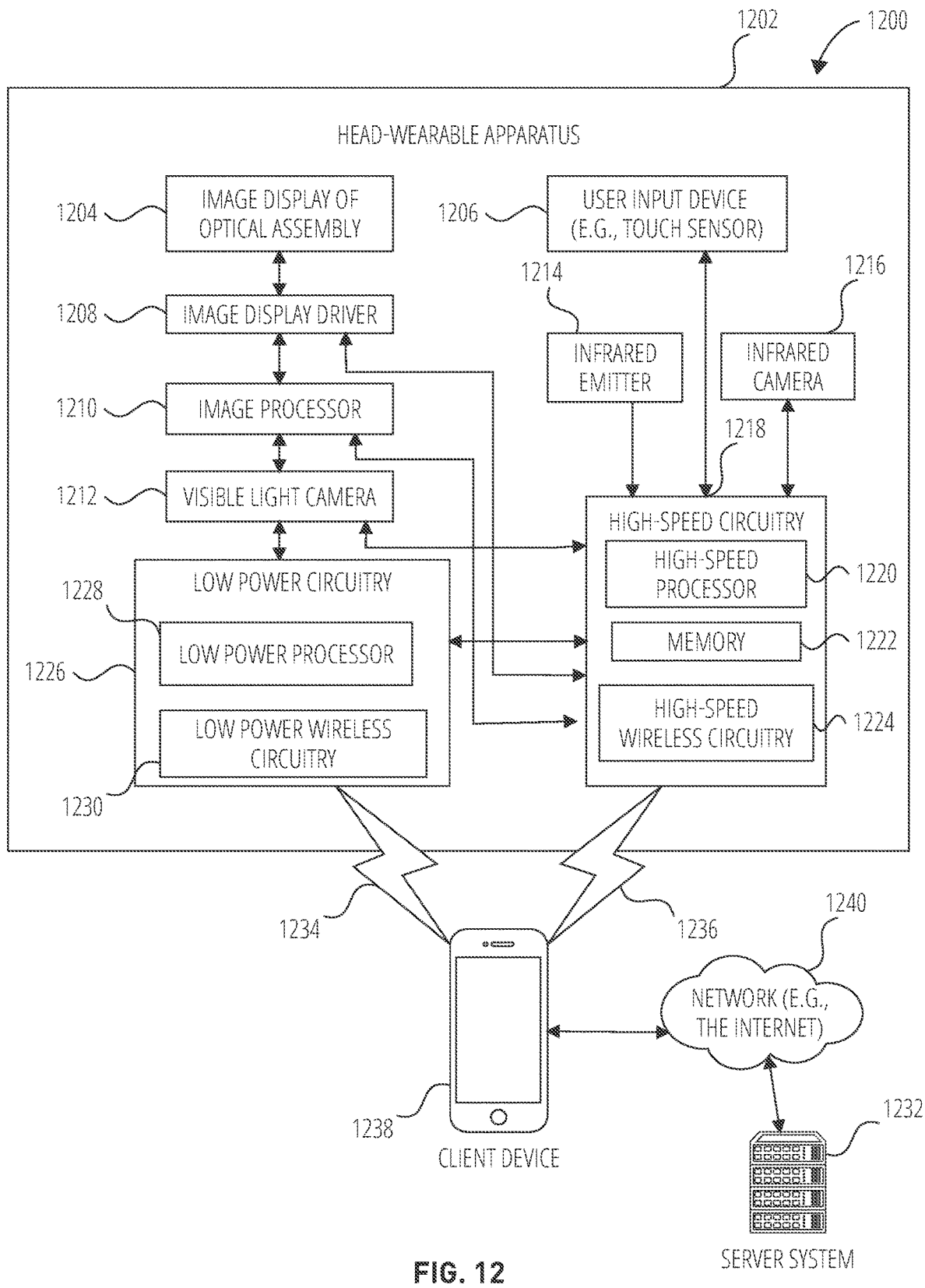
FIG. 12 illustrates a network environment in which a head-wearable device can be implemented according to one example embodiment.

FIG. 12 illustrates a network environment 1200 in which the head-wearable apparatus 1202 can be implemented according to one example embodiment. FIG. 12 is a high-level functional block diagram of an example head-wearable apparatus 1202 communicatively coupled a mobile client device 1238 and a server system 1232 via various network 1240.

head-wearable apparatus 1202 includes a camera, such as at least one of visible light camera 1212, infrared emitter 1214 and infrared camera 1216. The client device 1238 can be capable of connecting with head-wearable apparatus 1202 using both a communication 1234 and a communication 1236. client device 1238 is connected to server system 1232 and network 1240. The network 1240 may include any combination of wired and wireless connections.

The head-wearable apparatus 1202 further includes two image displays of the image display of optical assembly 1204. The two include one associated with the left lateral side and one associated with the right lateral side of the head-wearable apparatus 1202. The head-wearable apparatus 1202 also includes image display driver 1208, image processor 1210, low-power low power circuitry 1226, and high-speed circuitry 1218. The image display of optical assembly 1204 are for presenting images and videos, including an image that can include a graphical user interface to a user of the head-wearable apparatus 1202.

The image display driver 1208 commands and controls the image display of the image display of optical assembly 1204. The image display driver 1208 may deliver image data directly to the image display of the image display of optical assembly 1204 for presentation or may have to convert the image data into a signal or data format suitable for delivery to the image display device. For example, the image data may be video data formatted according to compression formats, such as H. 264 (MPEG-4), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 1202 includes a frame and stems (or temples) extending from a lateral side of the frame. The head-wearable apparatus 1202 further includes a user input device 1206 (e.g., touch sensor or push button) including an input surface on the head-wearable apparatus 1202. The user input device 1206 (e.g., touch sensor or push button) is to receive from the user an input selection to manipulate the graphical user interface of the presented image.

The components shown in FIG. 12 for the head-wearable apparatus 1202 are located on one or more circuit boards, for example a PCB or flexible PCB, in the rims or temples. Alternatively, or additionally, the depicted components can be located in the chunks, frames, hinges, or bridge of the head-wearable apparatus 1202. Left and right can include digital camera elements such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1202 includes a memory 1222 which stores instructions to perform a subset or all of the functions described herein. memory 1222 can also include storage device.

As shown in FIG. 12, high-speed circuitry 1218 includes high-speed processor 1220, memory 1222, and high-speed wireless circuitry 1224. In the example, the image display driver 1208 is coupled to the high-speed circuitry 1218 and operated by the high-speed processor 1220 in order to drive the left and right image displays of the image display of optical assembly 1204. high-speed processor 1220 may be any processor capable of managing high-speed communications and operation of any general computing system needed for head-wearable apparatus 1202. The high-speed processor 1220 includes processing resources needed for managing high-speed data transfers on communication 1236 to a wireless local area network (WLAN) using high-speed wireless circuitry 1224. In certain examples, the high-speed processor 1220 executes an operating system such as a LINUX operating system or other such operating system of the head-wearable apparatus 1202 and the operating system is stored in memory 1222 for execution. In addition to any other responsibilities, the high-speed processor 1220 executing a software architecture for the head-wearable apparatus 1202 is used to manage data transfers with high-speed wireless circuitry 1224. In certain examples, high-speed wireless circuitry 1224 is configured to implement Institute of Electrical and Electronic Engineers (IEEE) 802.11 communication standards, also referred to herein as Wi-Fi. In other examples, other high-speed communications standards may be implemented by high-speed wireless circuitry 1224.

The low power wireless circuitry 1230 and the high-speed wireless circuitry 1224 of the head-wearable apparatus 1202 can include short range transceivers (Bluetooth™) and wireless wide, local, or wide area network transceivers (e.g., cellular or WiFi). The client device 1238, including the transceivers communicating via the communication 1234 and communication 1236, may be implemented using details of the architecture of the head-wearable apparatus 1202, as can other elements of network 1240.

The memory 1222 includes any storage device capable of storing various data and applications, including, among other things, camera data generated by the left and right, infrared camera 1216, and the image processor 1210, as well as images generated for display by the image display driver 1208 on the image displays of the image display of optical assembly 1204. While memory 1222 is shown as integrated with high-speed circuitry 1218, in other examples, memory 1222 may be an independent standalone element of the head-wearable apparatus 1202. In certain such examples, electrical routing lines may provide a connection through a chip that includes the high-speed processor 1220 from the image processor 1210 or low power processor 1228 to the memory 1222. In other examples, the high-speed processor 1220 may manage addressing of memory 1222 such that the low power processor 1228 will boot the high-speed processor 1220 any time that a read or write operation involving memory 1222 is needed.

As shown in FIG. 12, the low power processor 1228 or high-speed processor 1220 of the head-wearable apparatus 1202 can be coupled to the camera (visible light camera 1212; infrared emitter 1214, or infrared camera 1216), the image display driver 1208, the user input device 1206 (e.g., touch sensor or push button), and the memory 1222.

The head-wearable apparatus 1202 is connected with a host computer. For example, the head-wearable apparatus 1202 is paired with the client device 1238 via the communication 1236 or connected to the server system 1232 via the network 1240. server system 1232 may be one or more computing devices as part of a service or network computing system, for example, that include a processor, a memory, and network communication interface to communicate over the network 1240 with the client device 1238 and head-wearable apparatus 1202.

The client device 1238 includes a processor and a network communication interface coupled to the processor. The network communication interface allows for communication over the network 1240, communication 1234 or communication 1236. client device 1238 can further store at least portions of the instructions for generating a binaural audio content in the client device 1238's memory to implement the functionality described herein.

Output components of the head-wearable apparatus 1202 include visual components, such as a display such as a liquid crystal display (LCD), a plasma display panel (PDP), a light emitting diode (LED) display, a projector, or a waveguide. The image displays of the optical assembly are driven by the image display driver 1208. The output components of the head-wearable apparatus 1202 further include acoustic components (e.g., speakers), haptic components (e.g., a vibratory motor), other signal generators, and so forth. The input components of the head-wearable apparatus 1202, the client device 1238, and server system 1232, such as the user input device 1206, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1202 may optionally include additional peripheral device elements. Such peripheral device elements may include biometric sensors, additional sensors, or display elements integrated with head-wearable apparatus 1202. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over and communication 1236 from the client device 1238 via the low power wireless circuitry 1230 or high-speed wireless circuitry 1224.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

Figure 13:
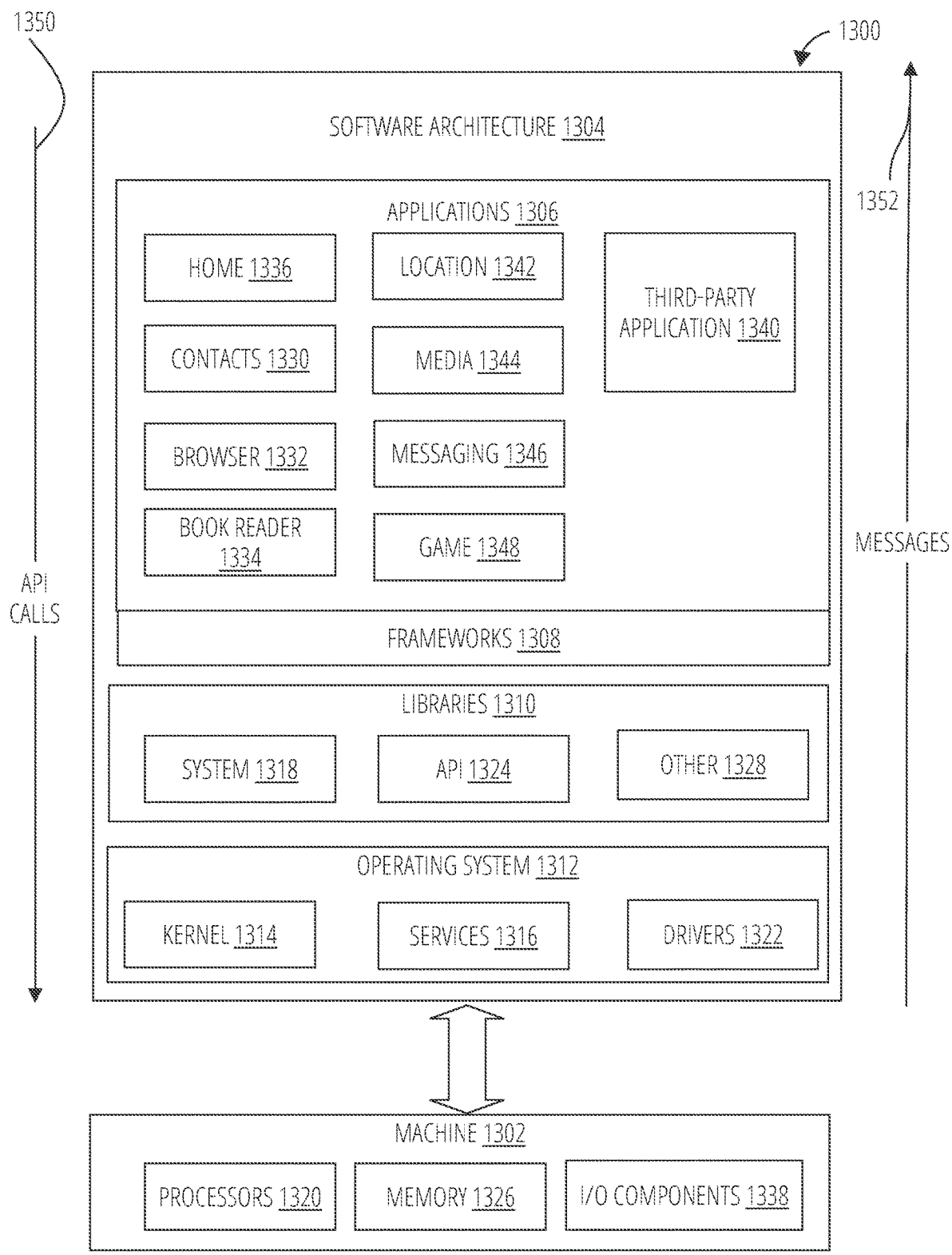
FIG. 13 is block diagram showing a software architecture within which the present disclosure may be implemented, according to an example embodiment.

FIG. 13 is a block diagram 1300 illustrating a software architecture 1304, which can be installed on any one or more of the devices described herein. The software architecture 1304 is supported by hardware such as a machine 1302 that includes Processors 1320, memory 1326, and I/O Components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, Processor management (e.g., scheduling), Component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1310 provide a low-level common infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a high-level common infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example embodiment, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or Linux OS, or other mobile operating systems. In this example, the third-party application 1340 can invoke the API calls 1350 provided by the operating system 1312 to facilitate functionality described herein.

Figure 14:
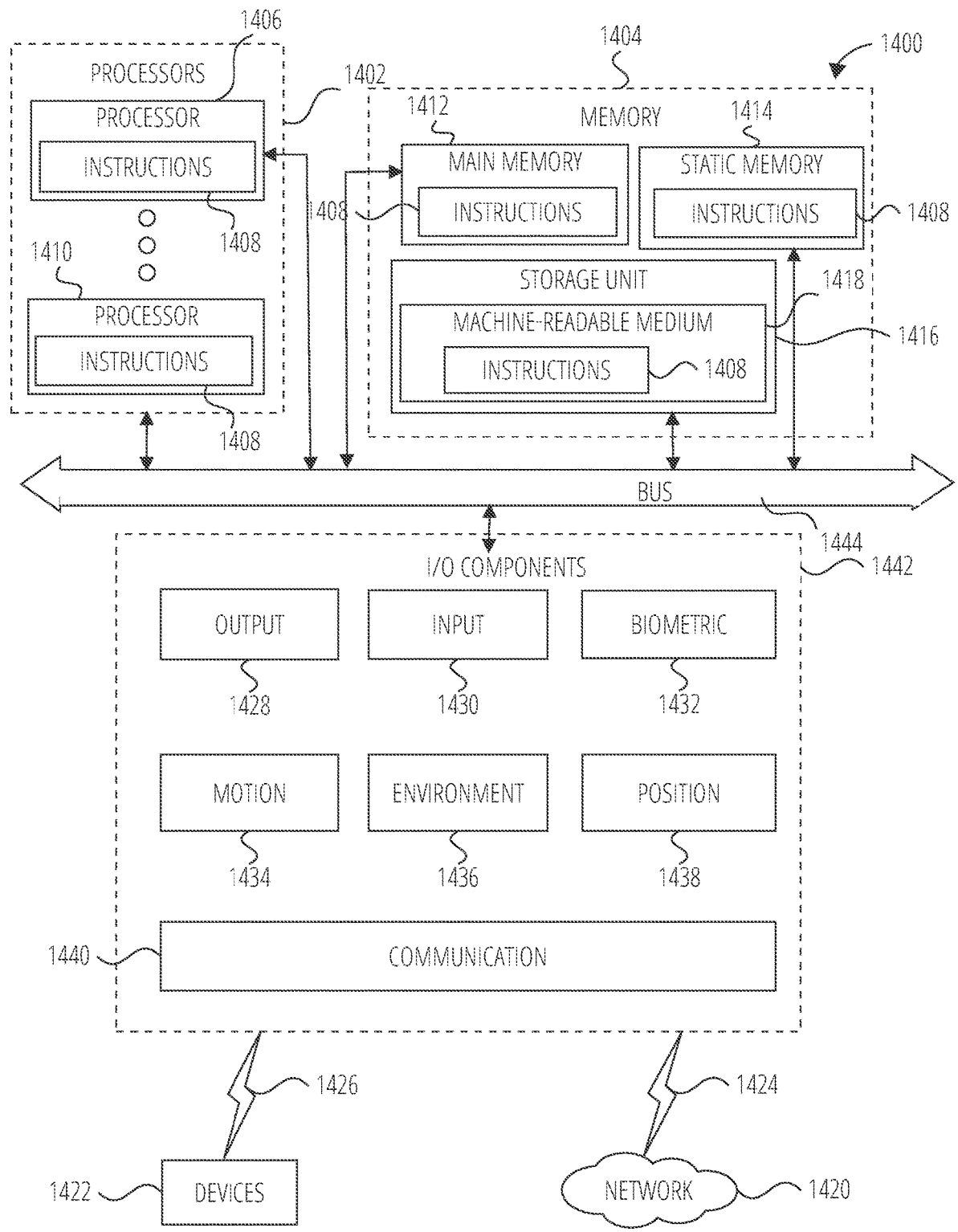
FIG. 14 is a diagrammatic representation of a machine in the form of a computer system within which a set of instructions may be executed for causing the machine to perform any one or more of the methodologies discussed herein, according to one example embodiment.

FIG. 14 is a diagrammatic representation of the machine 1400 within which instructions 1408 (e.g., software, a program, an application, an applet, an app, or other executable code) for causing the machine 1400 to perform any one or more of the methodologies discussed herein may be executed. For example, the instructions 1408 may cause the machine 1400 to execute any one or more of the methods described herein. The instructions 1408 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1408, sequentially or otherwise, that specify actions to be taken by the machine 1400. Further, while only a single machine 1400 is illustrated, the term "machine" shall also be taken to include a collection of machines that individually or jointly execute the instructions 1408 to perform any one or more of the methodologies discussed herein.

The machine 1400 may include Processors 1402, memory 1404, and I/O Components 1442, which may be configured to communicate with each other via a bus 1444. In an example embodiment, the Processors 1402 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1406 and a Processor 1410 that execute the instructions 1408. The term "Processor" is intended to include multi-core Processors that may comprise two or more independent Processors (sometimes referred to as "cores") that may execute instructions contemporaneously. Although FIG. 14 shows multiple Processors 1402, the machine 1400 may include a single Processor with a single core, a single Processor with multiple cores (e.g., a multi-core Processor), multiple Processors with a single core, multiple Processors with multiples cores, or any combination thereof.

The memory 1404 includes a main memory 1412, a static memory 1414, and a storage unit 1416, both accessible to the Processors 1402 via the bus 1444. The main memory 1404, the static memory 1414, and storage unit 1416 store the instructions 1408 embodying any one or more of the methodologies or functions described herein. The instructions 1408 may also reside, completely or partially, within the main memory 1412, within the static memory 1414, within machine-readable medium 1418 within the storage unit 1416, within at least one of the Processors 1402 (e.g., within the Processor's cache memory), or any suitable combination thereof, during execution thereof by the machine 1400.

The I/O Components 1442 may include a wide variety of Components to receive input, provide output, produce output, transmit information, exchange information, capture measurements, and so on. The specific I/O Components 1442 that are included in a particular machine will depend on the type of machine. For example, portable machines such as mobile phones may include a touch input device or other such input mechanisms, while a headless server machine will likely not include such a touch input device. It will be appreciated that the I/O Components 1442 may include many other Components that are not shown in FIG. 14. In various example embodiments, the I/O Components 1442 may include output Components 1428 and input Components 1430. The output Components 1428 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1430 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1442 may include biometric Components 1432, motion Components 1434, environmental Components 1436, or position Components 1438, among a wide array of other Components. For example, the biometric Components 1432 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1434 include acceleration sensor Components (e.g., accelerometer), gravitation sensor Components, rotation sensor Components (e.g., gyroscope), and so forth. The environmental Components 1436 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1438 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1442 further include communication Components 1440 operable to couple the machine 1400 to a network 1420 or devices 1422 via a coupling 1424 and a coupling 1426, respectively. For example, the communication Components 1440 may include a network interface Component or another suitable device to interface with the network 1420. In further examples, the communication Components 1440 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1422 may be another machine or any of a wide variety of peripheral devices (e.g., a peripheral device coupled via a USB).

Moreover, the communication Components 1440 may detect identifiers or include Components operable to detect identifiers. For example, the communication Components 1440 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1440, such as location via Internet Protocol (IP) geolocation, location via Wi-Fi® signal triangulation, location via detecting an NFC beacon signal that may indicate a particular location, and so forth.

The various memories (e.g., memory 1404, main memory 1412, static memory 1414, and/or memory of the Processors 1402) and/or storage unit 1416 may store one or more sets of instructions and data structures (e.g., software) embodying or used by any one or more of the methodologies or functions described herein. These instructions (e.g., the instructions 1408), when executed by Processors 1402, cause various operations to implement the disclosed embodiments.

The instructions 1408 may be transmitted or received over the network 1420, using a transmission medium, via a network interface device (e.g., a network interface Component included in the communication Components 1440) and using any one of a number of well-known transfer protocols (e.g., hypertext transfer protocol (HTTP)). Similarly, the instructions 1408 may be transmitted or received using a transmission medium via the coupling 1426 (e.g., a peer-to-peer coupling) to the devices 1422.

As used herein, the terms "Machine-Storage Medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of Machine-Storage Media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "Machine-Storage Media," "computer-storage media," and "device-storage media" specifically exclude carrier waves, modulated data signals, and other such media, at least some of which are covered under the term "signal medium" discussed below.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "Computer-Readable Medium," and "device-readable medium" mean the same thing and may be used interchangeably in this disclosure. The terms are defined to include both Machine-Storage Media and transmission media. Thus, the terms include both storage devices/media and carrier waves/modulated data signals.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Example 1 is a method for adjusting an over-rendered area comprising: identifying an angular velocity of a display device, a most recent pose of the display device, previous warp poses, and previous over-rendered areas; and adjusting a size of a dynamic over-rendered area based on a combination of the angular velocity, the most recent pose, the previous warp poses, and the previous over-rendered areas.

Example 2 includes example 1, wherein adjusting the size of the dynamic over-rendered area further comprises: retrieving the angular velocity from an Inertial Motion Unit (IMU) at the display device; detecting that the angular velocity exceeds a threshold; and in response to detecting that the angular velocity exceeds the threshold, increasing the size of the dynamic over-rendered area.

Example 3 includes example 1, wherein adjusting the size of the dynamic over-rendered area further comprises: identifying a first warp pose; identifying a first over-rendered area corresponding to the first warp pose; identifying a second warp pose following the first warp pose; identifying a second over-rendered area corresponding to the first warp pose; and forming the dynamic over-rendered area based on the first over-rendered area and the second over-rendered area.

Example 4 includes example 3, wherein the dynamic over-rendered area includes a portion of the first over-rendered area and a portion of the second over-rendered area.

Example 5 includes example 1, wherein adjusting the size of the dynamic over-rendered area further comprises: applying a heuristic algorithm to estimate the size of the dynamic over-rendered area based on the angular velocity, the most recent pose, the previous warp poses, or the previous over-rendered areas.

Example 6 includes example 1, wherein adjusting the size of the dynamic over-rendered area further comprises: applying a machine learning algorithm to estimate the size of the dynamic over-rendered area based on the angular velocity, the most recent pose, the previous warp poses, and the previous over-rendered areas.

Example 7 includes example 1, further comprising: generating virtual content based on the rendered pose; identify a size of the dynamic over-rendered area; rendering the virtual content in the dynamic over-rendered area; applying a transformation to a rendered image based on the most recent pose to generate a transformed image; and displaying the transformed image in a display of the display device.

Example 8 includes example 1, further comprising: accessing first sensor data from a plurality of sensors of the display device at a first time; determining, using a tracking system of the display device, a first pose of the display device based on the first sensor data; accessing second sensor data from the plurality of sensors of the display device at a second time that is subsequent to the first time; and determining, using the tracking system of the display device, a second pose of the display device based on the second sensor data.

Example 9 includes example 1, further comprising: adjusting the size of the dynamic over-rendered area based on a render rate of a 3D render engine of the display device.

Example 10 includes example 1, further comprising: generating, using an AR application of the display device, virtual content in the dynamic over-rendered area.

Example 11 is a computing apparatus comprising: a processor; and a memory storing instructions that, when executed by the processor, configure the apparatus to perform operations comprising: identify an angular velocity of a display device, a most recent pose of the display device, previous warp poses, and previous over-rendered areas; and adjust a size of a dynamic over-rendered area based on a combination of the angular velocity, the most recent pose, the previous warp poses, and the previous over-rendered areas.

Example 12 includes example 11, wherein adjusting the size of the dynamic over-rendered area further comprises: retrieve the angular velocity from an Inertial Motion Unit (IMU) at the display device; detect that the angular velocity exceeds a threshold; and in response to detecting that the angular velocity exceeds the threshold, increase the size of the dynamic over-rendered area.

Example 13 includes example 11, wherein adjusting the size of the dynamic over-rendered area further comprises:

identify a first warp pose; identify a first over-rendered area corresponding to the first warp pose; identify a second warp pose following the first warp pose; identify a second over-rendered area corresponding to the first warp pose; and form the dynamic over-rendered area based on the first over-rendered area and the second over-rendered area.

Example 14 includes example 13, wherein the dynamic over-rendered area includes a portion of the first over-rendered area and a portion of the second over-rendered area.

Example 15 includes example 11, wherein adjusting the size of the dynamic over-rendered area further comprises: apply a heuristic algorithm to estimate the size of the dynamic over-rendered area based on the angular velocity, the most recent pose, the previous warp poses, or the previous over-rendered areas.

Example 16 includes example 11, wherein adjusting the size of the dynamic over-rendered area further comprises: apply a machine learning algorithm to estimate the size of the dynamic over-rendered area based on the angular velocity, the most recent pose, the previous warp poses, and the previous over-rendered areas.

Example 17 includes example 11, wherein the instructions further configure the apparatus to: generate virtual content based on the rendered pose; identify a size of the dynamic over-rendered area; render the virtual content in the dynamic over-rendered area; apply a transformation to a rendered image based on the most recent pose to generate a transformed image; and display the transformed image in a display of the display device.

Example 18 includes example 11, wherein the instructions further configure the apparatus to: access first sensor data from a plurality of sensors of the display device at a first time; determine, using a tracking system of the display device, a first pose of the display device based on the first sensor data; access second sensor data from the plurality of sensors of the display device at a second time that is subsequent to the first time; and determine, using the tracking system of the display device, a second pose of the display device based on the second sensor data.

Example 19 includes example 11, wherein the instructions further configure the apparatus to: adjust the size of the dynamic over-rendered area based on a render rate of a 3D render engine of the display device.

Example 20 is a non-transitory computer-readable storage medium, the computer-readable storage medium including instructions that when executed by a computer, cause the computer to perform operations comprising: identify an angular velocity of a display device, a most recent pose of the display device, previous warp poses, and previous over-rendered areas; and adjust a size of a dynamic over-rendered area based on a combination of the angular velocity, the most recent pose, the previous warp poses, and the previous over-rendered areas.

What is claimed is:

1. A method comprising:
   accessing training data that is based on a combination of most recent pose data, warp pose history data, and over-rendered area history data;
   training, using a machine learning algorithm, a machine learning model based on the training data;
   identifying a most recent pose of a display device, previous warp poses that are prior to the most recent pose, and previous over-rendered areas; and
   adjusting a size of a dynamic over-rendered area based on the machine learning model and at least one of the most recent pose of a display device, the previous warp poses that are prior to the most recent pose, or the previous over-rendered areas.

2. The method of claim 1, further comprising:
   wherein adjusting the size of the dynamic over-rendered area is further based on the most recent pose, the previous warp poses that are prior to the most recent pose, and the previous over-rendered areas.

3. The method of claim 1, wherein adjusting the size of the dynamic over-rendered area further comprises:
   identifying an angular velocity of a display device;
   detecting that the angular velocity exceeds a threshold; and
   in response to detecting that the angular velocity exceeds the threshold, increasing the size of the dynamic over-rendered area.

4. The method of claim 1, wherein adjusting the size of the dynamic over-rendered area further comprises:
   identifying a first warp pose of a display device;
   identifying a first over-rendered area corresponding to the first warp pose;
   identifying a second warp pose following the first warp pose;
   identifying a second over-rendered area corresponding to the first warp pose; and
   forming the dynamic over-rendered area based on the first over-rendered area and the second over-rendered area.

5. The method of claim 4, wherein the dynamic over-rendered area includes a portion of the first over-rendered area and a portion of the second over-rendered area.

6. The method of claim 1, wherein adjusting the size of the dynamic over-rendered area is further based on a heuristic algorithm.

7. The method of claim 1, further comprising:
   generating virtual content based on a rendered pose;
   identifying the size of the dynamic over-rendered area;
   rendering the virtual content in the dynamic over-rendered area;
   applying a transformation to a rendered image based on a most recent pose to generate a transformed image; and
   displaying the transformed image in a display of a display device.

8. The method of claim 1, further comprising:
   accessing first sensor data from a sensor of a display device at a first time;
   determining, using a tracking system of the display device, a first pose of the display device based on the first sensor data;
   accessing second sensor data from the sensor of the display device at a second time that is subsequent to the first time; and
   determining, using the tracking system of the display device, a second pose of the display device based on the second sensor data.

9. The method of claim 1, wherein adjusting the size of the dynamic over-rendered area is further based on a render rate of a 3D render engine of a display device.

10. The method of claim 1, further comprising:
    generating, using an AR application of a display device, virtual content in the dynamic over-rendered area.

11. A display device comprising:
    a processor; and
    a memory storing instructions that, when executed by the processor, configure the display device to perform operations comprising:

accessing training data that is based on a combination of most recent pose data, warp pose history data, and over-rendered area history data;

training, using a machine learning algorithm, a machine learning model based on the training data;

identifying a most recent pose of a display device, previous warp poses that are prior to the most recent pose, and previous over-rendered areas; and adjusting a size of a dynamic over-rendered area based on the machine learning model and at least one of the most recent pose of a display device, the previous warp poses that are prior to the most recent pose, and the previous over-rendered areas.

12. The display device of claim 11, wherein the operations further comprise:
wherein adjusting the size of the dynamic over-rendered area is further based on the most recent pose, the previous warp poses that are prior to the most recent pose, and the previous over-rendered areas.

13. The display device of claim 11, wherein adjusting the size of the dynamic over-rendered area further comprises:
identifying an angular velocity of a display device;
detecting that the angular velocity exceeds a threshold; and
in response to detecting that the angular velocity exceeds the threshold, increasing the size of the dynamic over-rendered area.

14. The display device of claim 11, wherein adjusting the size of the dynamic over-rendered area further comprises:
identifying a first warp pose of a display device;
identifying a first over-rendered area corresponding to the first warp pose;
identifying a second warp pose following the first warp pose;
identifying a second over-rendered area corresponding to the first warp pose; and
forming the dynamic over-rendered area based on the first over-rendered area and the second over-rendered area.

15. The display device of claim 14, wherein the dynamic over-rendered area includes a portion of the first over-rendered area and a portion of the second over-rendered area.

16. The display device of claim 11, wherein adjusting the size of the dynamic over-rendered area is further based on a heuristic algorithm.

17. The display device of claim 11, wherein the operations further comprise:
generating virtual content based on a rendered pose;
identifying the size of the dynamic over-rendered area;
rendering the virtual content in the dynamic over-rendered area;
applying a transformation to a rendered image based on a most recent pose to generate a transformed image; and
displaying the transformed image in a display of a display device.

18. The display device of claim 11, wherein the operations further comprise:
accessing first sensor data from a sensor of a display device at a first time;
determining, using a tracking system of the display device, a first pose of the display device based on the first sensor data;
accessing second sensor data from the sensor of the display device at a second time that is subsequent to the first time; and
determining, using the tracking system of the display device, a second pose of the display device based on the second sensor data.

19. The display device of claim 11, wherein adjusting the size of the dynamic over-rendered area is further based on a render rate of a 3D render engine of a display device.

20. A non-transitory computer-readable storage medium, the computer-readable storage medium including instructions that when executed by a display device, cause the display device to perform operations comprising:
accessing training data that is based on a combination of most recent pose data, warp pose history data, and over-rendered area history data;
training, using a machine learning algorithm, a machine learning model based on the training data;
identifying a most recent pose of a display device, previous warp poses that are prior to the most recent pose, and previous over-rendered areas; and
adjusting a size of a dynamic over-rendered area based on the machine learning model and at least one of the most recent pose of a display device, the previous warp poses that are prior to the most recent pose, or the previous over-rendered areas.

* * * * *